United States Patent [19]

Parks et al.

[11] Patent Number: 5,039,270
[45] Date of Patent: Aug. 13, 1991

[54] PHYSICALLY INTEGRATED MANUFACTURING AND MATERIALS HANDLING SYSTEM

[75] Inventors: Ronald K. Parks, Omaha; Arden K. Zink, Louisville, both of Nebr.

[73] Assignee: Millard Manufacturing Corp., Omaha, Nebr.

[21] Appl. No.: 368,043

[22] Filed: May 22, 1989

[51] Int. Cl.⁵ .............................................. B65G 1/04
[52] U.S. Cl. ..................... 414/286; 414/21; 414/799; 414/277; 414/268; 414/416; 198/463.3
[58] Field of Search ................ 414/21, 799, 222, 266, 414/267, 266, 270, 273, 277, 279, 281, 288, 286, 278, 416, 626; 198/463.3, 502.1, 504, 505, 955, 782

[56] References Cited

U.S. PATENT DOCUMENTS

| | | | |
|---|---|---|---|
| 2,990,069 | 6/1961 | Repasky et al. | 414/799 |
| 3,094,225 | 6/1963 | Repasky et al. | 414/799 X |
| 3,195,710 | 7/1965 | Robinson | 198/463.3 X |
| 3,522,942 | 8/1970 | Hepp | 198/463.3 X |
| 3,690,435 | 9/1972 | King et al. | 198/463.3 |
| 4,470,741 | 9/1984 | Bossler et al. | 414/286 X |
| 4,631,021 | 12/1986 | Hayashi | 198/505 X |
| 4,773,810 | 9/1988 | Nishimura et al. | 414/799 X |

FOREIGN PATENT DOCUMENTS

| | | | |
|---|---|---|---|
| 942686 | 2/1974 | Canada | 414/278 |
| 3440456 | 5/1986 | Fed. Rep. of Germany | 414/277 |
| 8501493 | 4/1985 | PCT Int'l Appl. | 414/268 |
| 193167 | 12/1964 | Sweden | 414/278 |
| 891545 | 12/1981 | U.S.S.R. | 198/782 |

Primary Examiner—Frank E. Werner
Attorney, Agent, or Firm—Zarley, McKee, Thomte, Voorhees & Sease

[57] ABSTRACT

A physically integrated manufacturing and materials handling system comprising a conveyor system and a storage system. A conveyor system is described which includes structure for receiving pallets having metal sheets or the like placed thereon so that the metal sheets may be removed therefrom and placed on a storage system pallet. The loaded storage system pallets are transported to storage bays or other locations within the facility by means of an electronically guided forklift truck.

14 Claims, 15 Drawing Sheets

PHYSICALLY INTEGRATED MANUFACTURING AND MATERIALS HANDLING SYSTEM

BACKGROUND OF THE INVENTION

In many manufacturing facilities, stacks of material such as metal sheets or the like are delivered to the facility on wooden skids or pallets. Although materials other than metal sheets may be delivered to manufacturing facilities, the term metal sheets will be used herein for purposes of clarity and conciseness. The wooden skids do not lend themselves to convenient handling or storage so it is necessary to transfer the metal sheets from the wooden skids to some form of metal pallet which may be more conveniently handled. In most cases, the pallets are moved from location to location within the facility by means of forklift trucks which usually include a pair of vertically movable forks which engage the underside of the pallet. If the forks of the forklift truck are not precisely positioned beneath as in the pallet, the pallet could fall from the forks since the pallets are being supported at approximately the center thereof.

Once the metal sheets have been removed from the wooden pallets and placed on a metal pallet, the problem of conveying the same to the press brakes, etc. is troublesome as is the storage of the same if the material is not going to be used immediately. Further, once the material has been fabricated into a finished product, the handling, storage and shipment of the same is also inconvenient.

Therefore, it is a principal object of the invention to provide an improved materials handling system for use in a metal fabrication facility.

Still another object of the invention is to provide a physically integrated manufacturing system.

Still another object of the invention is to provide a materials handling system which conveniently provides a means for handling metal sheets from delivery to fabrication to shipment.

Still another object of the invention is to provide a materials handling system for transferring metal sheets positioned on wooden pallets to system pallets.

Still another object of the invention is to provide an improved pallet having recesses at its lower outer ends for receiving the forks of a forklift truck.

Still another object of the invention is to provide an improved pallet which is engaged at the ends thereof by the forks of a forklift truck for increased stability and safety.

Still another object of the invention is to provide an improved pallet which permits the forks of a forklift vehicle to bypass the load on a pallet positioned below the pallet being handled.

Still another object of the invention is to provide a system of the type described including elongated conveyors having transversely extending conveyors associated therewith for supplying empty pallets thereto, and removing loaded pallets therefrom.

Yet another object of the invention is to provide an electronically guided vehicle for conveying or transporting materials from one location to another within the facility.

Yet another object of the invention is to provide a cantilevered side-loading forklift vehicle.

Yet another object of the invention is to provide a system for removing loaded pallets from a storage bay.

These and other objects will be apparent to those skilled in the art.

SUMMARY OF THE INVENTION

A physically integrated manufacturing and materials handling system is described which includes a conveyor system for receiving loaded wooden skids thereon. The system includes means for lifting the metal sheets or plates from the wooden skid so that the wooden skid may be removed therefrom. Once the wooden skid has been removed from beneath the suspended metal plates, a system pallet is positioned therebelow and the plates positioned thereon. The loaded system pallet is then conveyed transversely with respect to the main conveyor and is delivered to the desired location by means of a forklift truck. Preferably, the forklift truck is an electronically guided vehicle. The system also includes a novel pallet and conveyors associated with storage cells to facilitate the convenient removal of material from certain of the system pallets stored in the storage cells.

DESCRIPTION OF THE PREFERRED EMBODIMENT

Figure 1:
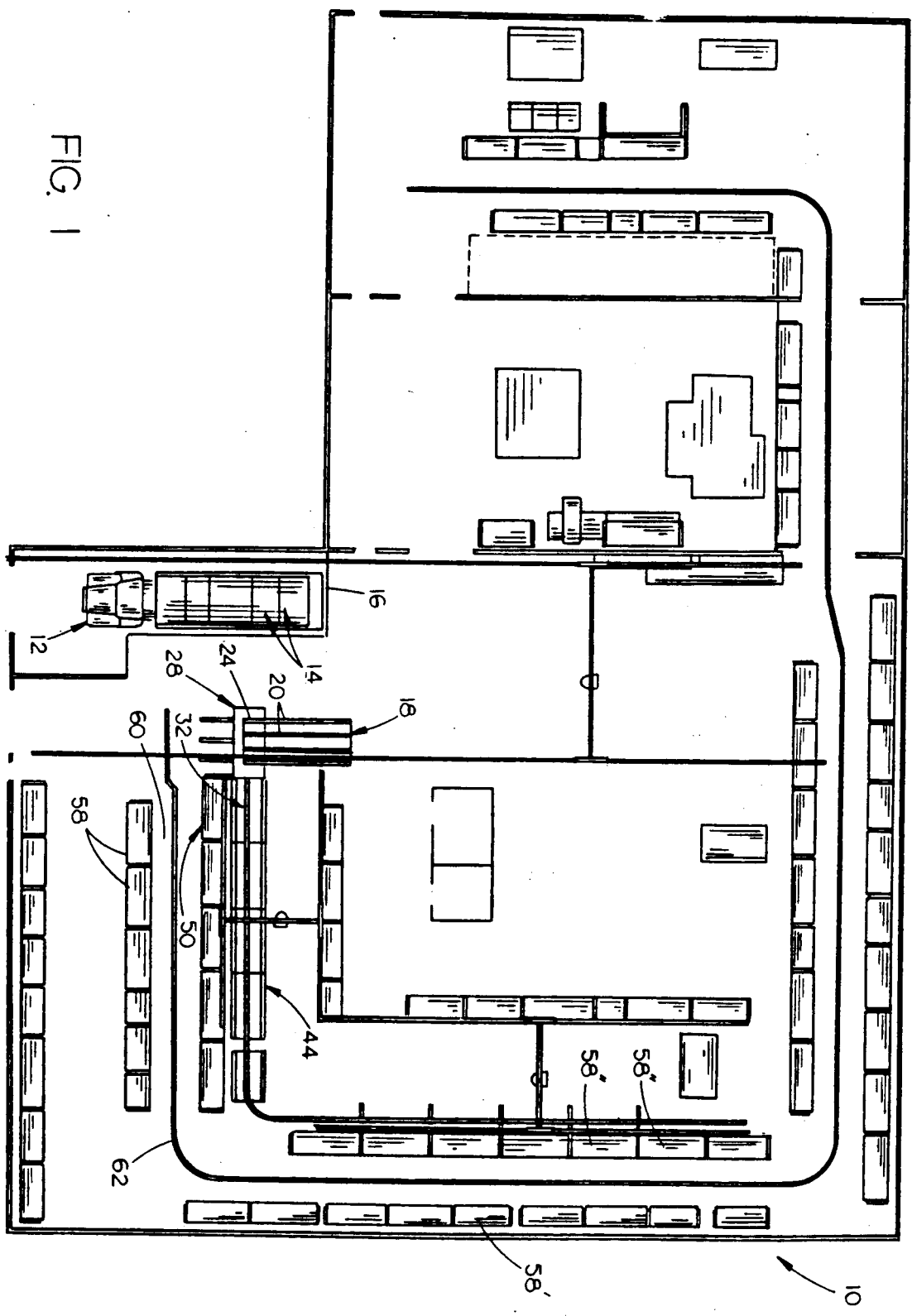
FIG. 1 is a schematic view of the layout of a manufacturing facility utilizing the materials handling equipment of this invention.

In FIG. 1, the numeral 10 refers generally to a metal manufacturing or fabrication business having the system of this invention provided therein. In FIG. 1, a truck 12 delivers skids or pallets 14 to the loading dock 16. The skids 14 are normally comprised of wood upon which sheets or plates 17 of metal material have been positioned.

Figure 2:
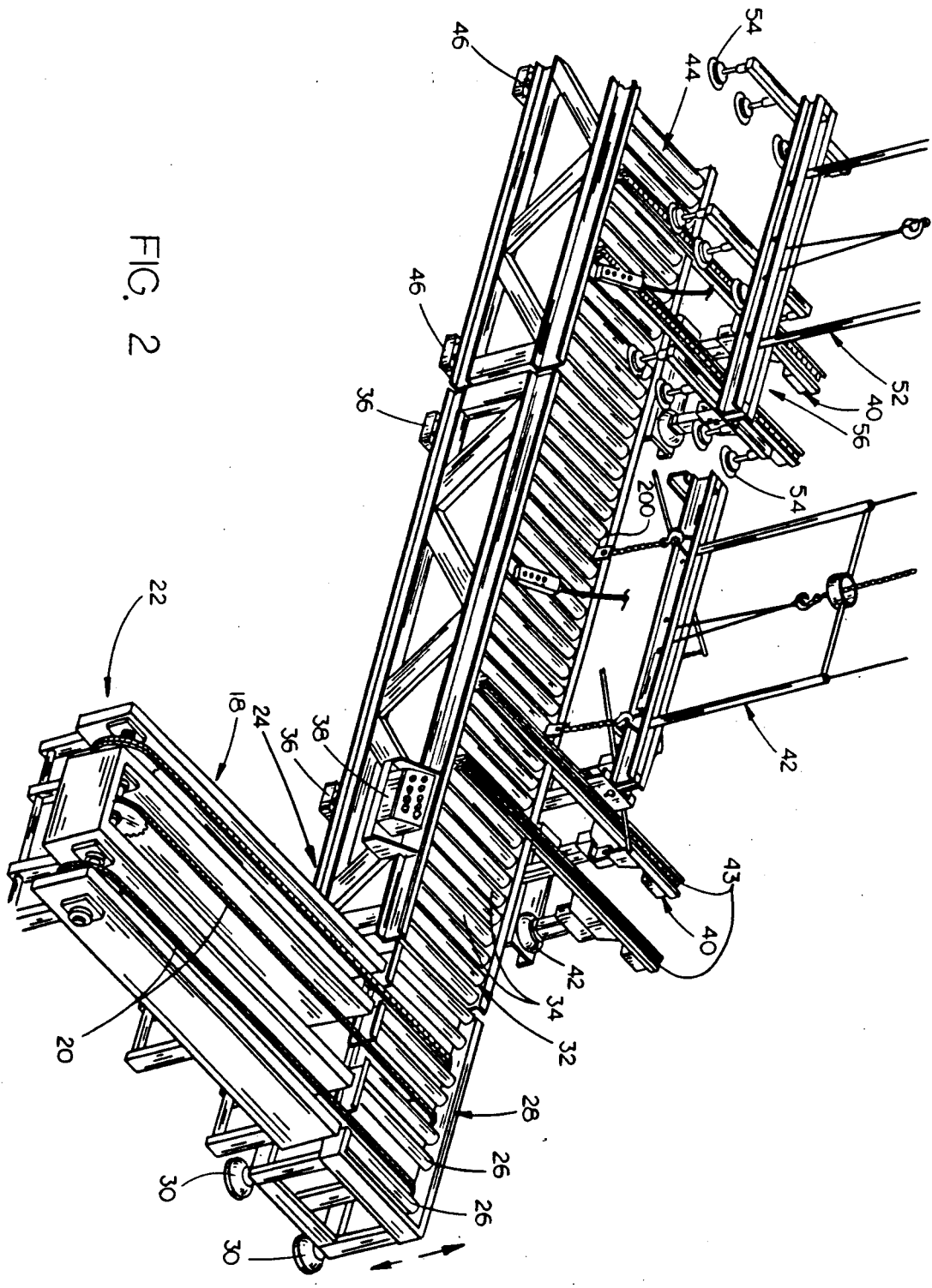
FIG. 2 is a partial perspective view of the conveyor portion of the system.

As seen in FIG. 2, the numeral 18 refers to a first elongated conveyor section or portion having a plurality of conveyor chains 20 mounted thereon adapted to convey the pallets 14 from end 22 to end 24. End 24 of conveyor 18 is received between the rollers 26 of conveyor section 28 which extends transversely to conveyor section 18. Conveyor section 28 is supported on a plurality of inflatable air bags 30 to enable the conveyor section 28 to be vertically moved with respect to conveyor section 18. When conveyor section 28 is in its lowermost condition, the pallet on conveyor section 18 will be moved onto and over conveyor section 28 without conveyor section 28 having any effect thereon. When conveyor section 28 is vertically moved upwardly relative to conveyor section 18 through the use of the air bags 30, the powered conveyor rollers 26 will engage the underside of the pallet 14 to move the pallet 14 and the material thereon longitudinally on conveyor section 28.

Positioned adjacent one end of conveyor section 28 is conveyor section 32 which is also comprised of a plurality of horizontally disposed powered conveyor rollers 34. In some cases, conveyor section 28 may be omitted with the chains of conveyor section 18 being in communication with one end of the conveyor section 32.

Conveyor section 32 is supported on a plurality of conventional weigh cells 36 which are designed to weigh the load on the conveyor section 32 and to provide a weight printout by means of the printout mechanism 37.

One end of a lateral transverse conveyor section 40 extends between the rollers 34 of conveyor section 32 as seen in FIG. 2. Conveyor section 40 is vertically movably supported on a plurality of inflatable air bags 42 so that the conveyor section 40 may be selectively vertically moved with respect to conveyor section 32. When conveyor section 40 is in its lowered condition, the conveyor chains 43 of conveyor section 40 will be positioned below the upper surface of the conveyor rollers 34 and will have no effect on any load positioned on conveyor section 32. When conveyor section 40 is in its raised position, the conveyor chains 43 will support any load thereon above the plane of the conveyor rollers 34 so that pallets may be moved onto the conveyor section 32 or removed therefrom.

A vertically movable plate hook or sheet hook lifting assembly 42 is positioned over conveyor section 32 and is designed to lift the metal sheets or plates from the wooden pallet or skid 14 when the skid or pallet 14 has been positioned therebelow. Thus, the wooden pallet 14 is conveyed along the length of the conveyor section 18 to the conveyor section 28 which then conveys the pallet 14 to the conveyor section 32 until the pallet is positioned below the lifting means 42. Lifting means 42 is then utilized to lift the stack of plates from the wooden pallet 14. The empty pallet 14 is then expelled to the left as viewed in FIG. 2 so that it passes to the conveyor section 44 which is also supported on a plurality of weigh cells 46.

Figure 3:
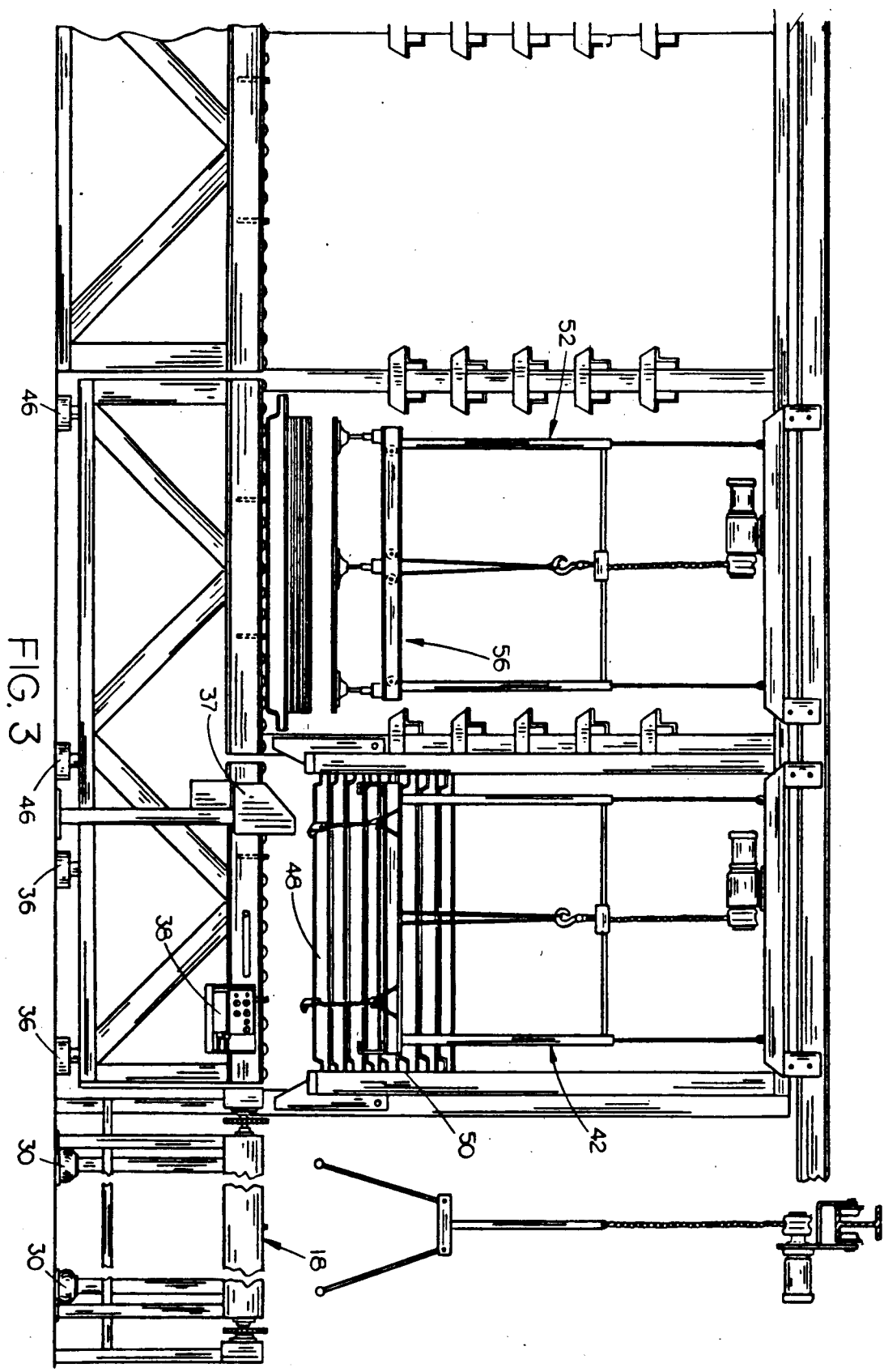
FIG. 3 is a side view of a portion of the conveyor system.

Once the sheets have been lifted from the pallet 14 and the empty pallet 14 has been moved to the left as viewed in FIG. 2, conveyor section 40 is utilized to transport or convey an empty system pallet 48 from the pallet accumulator 50 which is positioned laterally of conveyor section 32 and above the outer end of conveyor section 40. Pallet accumulator 50 is designed to store a plurality of the pallets 48 in the horizontally disposed and vertically spaced condition as seen in FIG. 3. Conveyor section 40 conveys an empty system pallet 48 from the accumulator 50 onto the conveyor section 32 below the suspended sheets of material. The lifting means 42 is then utilized to lower the suspended sheets onto the pallet 48 positioned therebelow. Conveyor section 40 is then actuated to convey the loaded pallet 48 from the conveyor section 32 to the outer end of the conveyor section 40 where the forklift truck 100 which will be described hereinafter, can remove the loaded pallet therefrom for delivery to a shear, press brake, etc. or to a storage area.

A second lifting means 52 of the vacuum type having a plurality of vacuum devices 54 positioned thereon is movably located over the conveyor section 44 and is supported on an overhead rail so that the lifting means 52 may be moved from one location within the facility to another as required. In FIG. 2, the numeral 56 refers to another lateral transverse conveyor which is in communication with the conveyor section 44 as seen to permit pallets to be conveyed laterally onto the conveyor section 44 or removed therefrom as required. If desired, an additional conveyor section or sections may be positioned in an end-to-end relationship with conveyor section 44. Further, additional transverse conveyor sections similar to sections 32 and 44 may be utilized if desired.

Positioned laterally of the conveyor sections 28, 32 and 44 are a plurality of upstanding storage bays 58 (FIG. 1) which have vertically spaced-apart shelves thereon adapted to support the pallets 48 therein. Storage bays 58 define an aisle 60 as seen in FIG. 1. FIG. 1 also illustrates that a plurality of the storage bays 58, are positioned in an end-to-end relationship opposite to a plurality of storage bays 58,,.

Extending through the various aisles is a metallic strip 62 which is positioned on the floor of the facility to provide a guidance path for the forklift truck 100 as will be described in more detail hereinafter.

Figure 6:
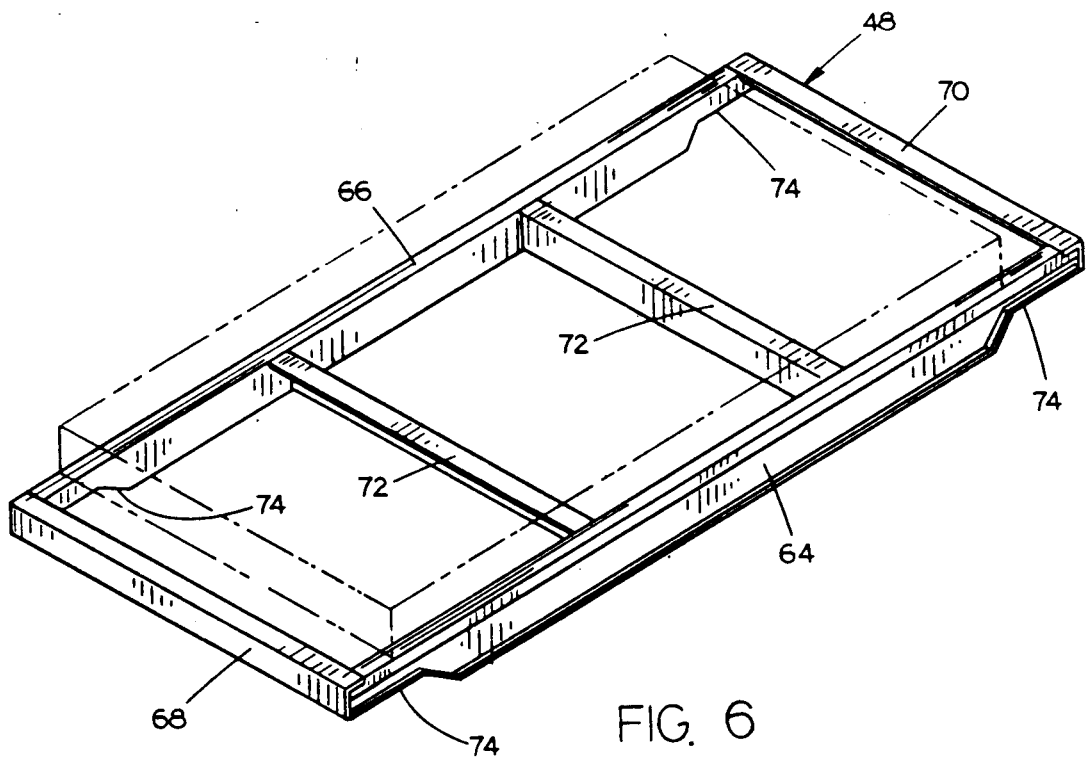
FIG. 6 is a perspective view of the system pallet of this invention.

As seen in FIG. 6, each of the pallets 48 includes side frame members 64 and 66 having end frame members 68 and 70 secured thereto and extending therebetween. A plurality of intermediate frame members 72 also extend between the side frame members 64 and 66. The ends of the side frame members 64 and 66 are recessed at 74 so that the forks or tines of the forklift truck may be received thereby in such a manner so as to bypass the load positioned on a pallet beneath the pallet being handled. The fact that the tines or forks of the forklift truck engage the underside of the pallet at the opposite ends thereof increases the safety and stability of the operation since the pallet will not tend to inadvertently fall therefrom.

Figure 4:
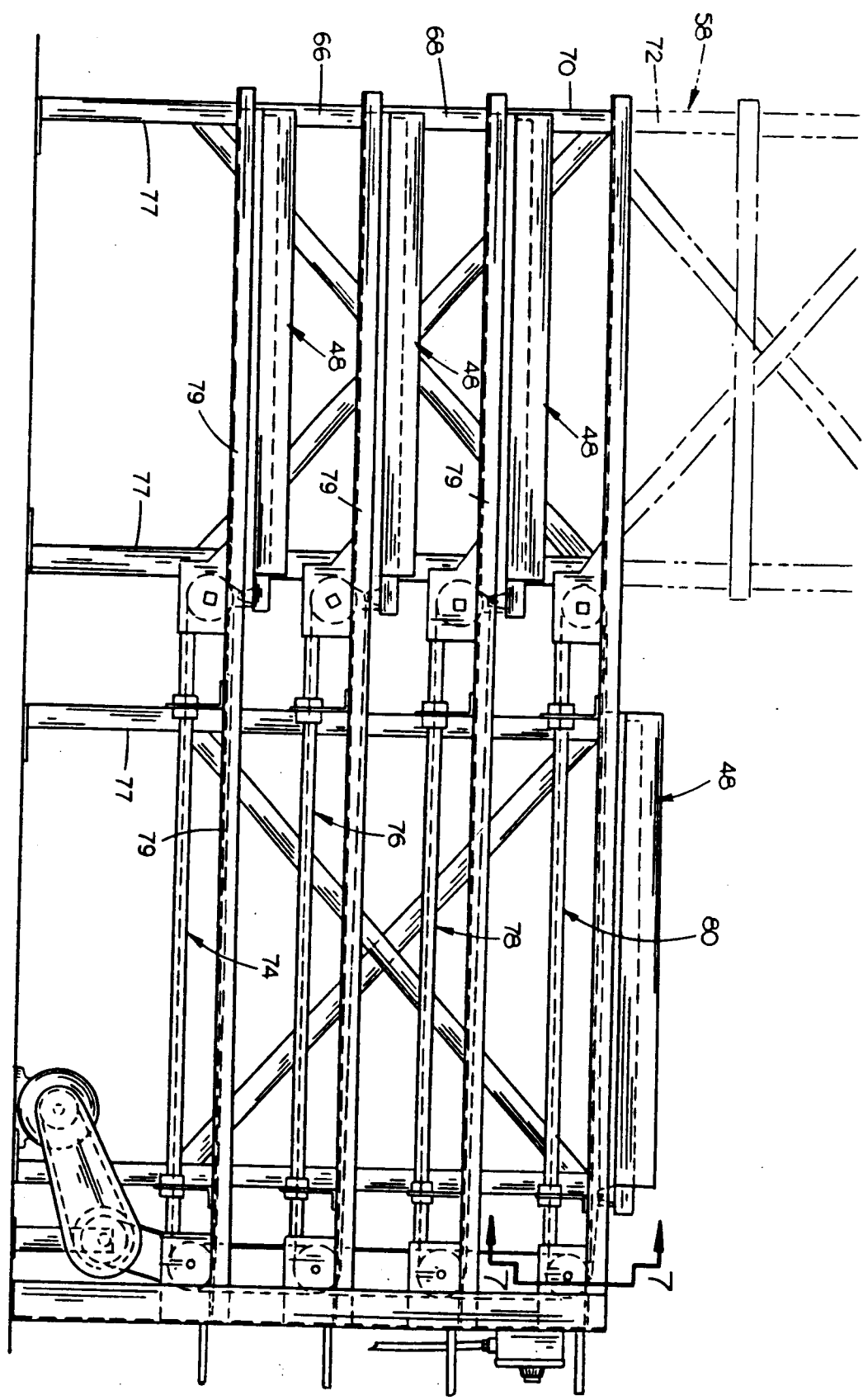
FIG. 4 is a side elevational view of a conveyor system for transferring loaded pallets from a storage bay.

As shown in FIG. 4, the storage bays or racks are comprised of a plurality of vertically disposed frame members 77 suitably interconnected with each other by bracings. Each of the frame members has a plurality of vertically spaced brackets 79 which are adapted to support the recessed ends of the pallets 48. The design of the frame members 77 and brackets 79 is such that the pallets 48 may be placed on the desired row of brackets from either side of the storage bay or removed therefrom from either side. Further, the design of the frame members 77 and brackets 79 is such that the pallets 48 may be sufficiently vertically spaced to accommodate pallets having finished or bulky materials thereon. The interconnectors and the design of the storage bays or racks also permits monorails, jib booms, safety nets, etc. to be supported thereby without supporting those items from the building framework itself.

Figure 5:
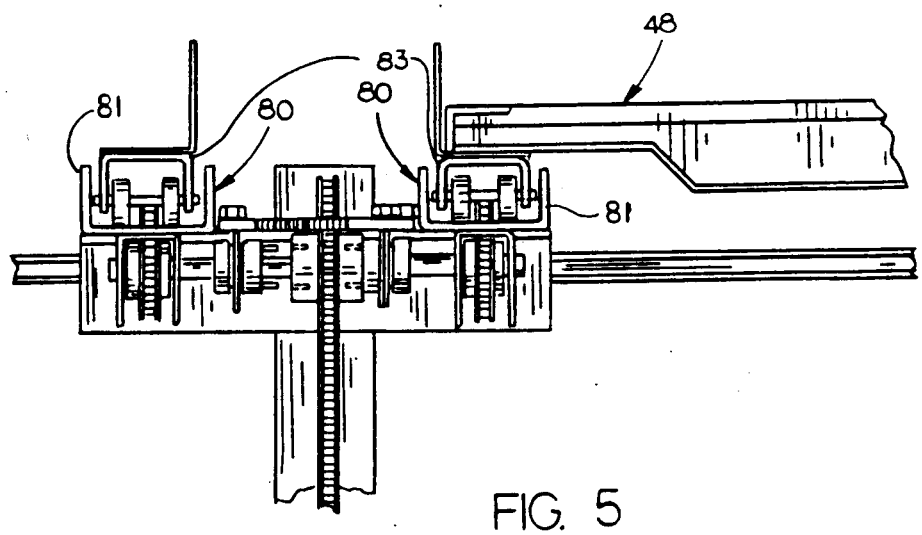
FIG. 5 is an enlarged sectional view seen on lines 7—7 of FIG. 4.
Figure 7:
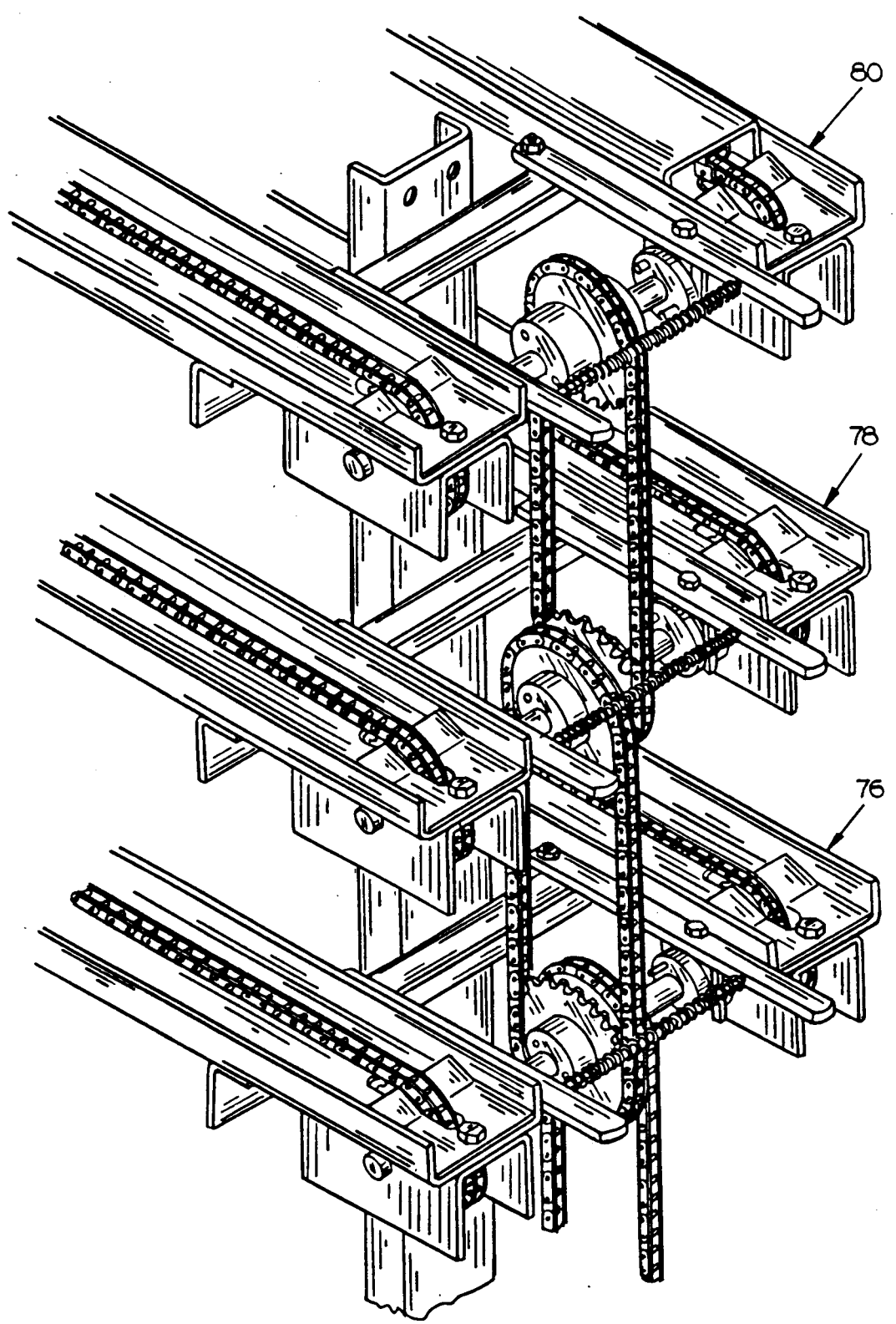
FIG. 7 is a perspective view of the drive mechanism of the conveyor system of FIG. 4.

It is preferred that at least some of the storage bays 58" have means for laterally transversely conveying some of the loaded system pallets therefrom so that the material on the loaded pallets may be transported or carried to a location requiring the same such as a press brake, etc. FIG. 4 illustrates that the lowermost cells 66, 68, 70 and 72 of a bay 58" are provided with conveyors 74, 76, 78 and 80 respectively, for selectively conveying the loaded pallets 48 laterally therefrom so that access may be conveniently gained to the material on the loaded pallets positioned in the cells. FIGS. 5 and 7 illustrate that conveyors identical to conveyors 74, 76, 78 and 80 may be positioned adjacent thereto. In FIG. 7, the adjacent conveyors are identified as 76', 78' and 80' with conveyor 74' not being shown. Each of the conveyors 74, 76, 78 and 80 are provided with spaced-apart channels 81 having chain driven support channels 83 movably mounted therein. As seen in FIG. 5, the channels 83 are designed to engage and support the ends of a system pallet 48 thereon. Suitable drive and control means is provided for selectively controlling the operation of the various conveyors in bay 58".

Referring to FIGS. 8-18, the numeral 100 refers to a pallet-moving truck designed to move pallets between locations in the facility such as from one cell to another cell or from a cell to one of the conveyors so that the material on the pallet may be processed. Truck 100 includes a wheeled frame means 102 generally including a pair of transversely extending frame members 104 and 106 which are of the I-beam type. Caster wheels 108 are operatively mounted at the outer end of frame member 104 while caster wheels 110 are operatively mounted at the outer end of frame member 106. A steerable and driven Wheel 112 is operatively secured to the inner end of frame member 104 and is driven by a conventional hydraulic or electric motor (not shown). A steerable and driven wheel 114 is operatively connected to the inner end of frame member 106 and is driven by a conventional hydraulic or electric motor 116. Wheels 112 and 114 are steered by means of hydraulic cylinders 240 and 240' operatively connected to sensing devices 118 and 120 as will be described in more detail hereinafter.

Figure 12:
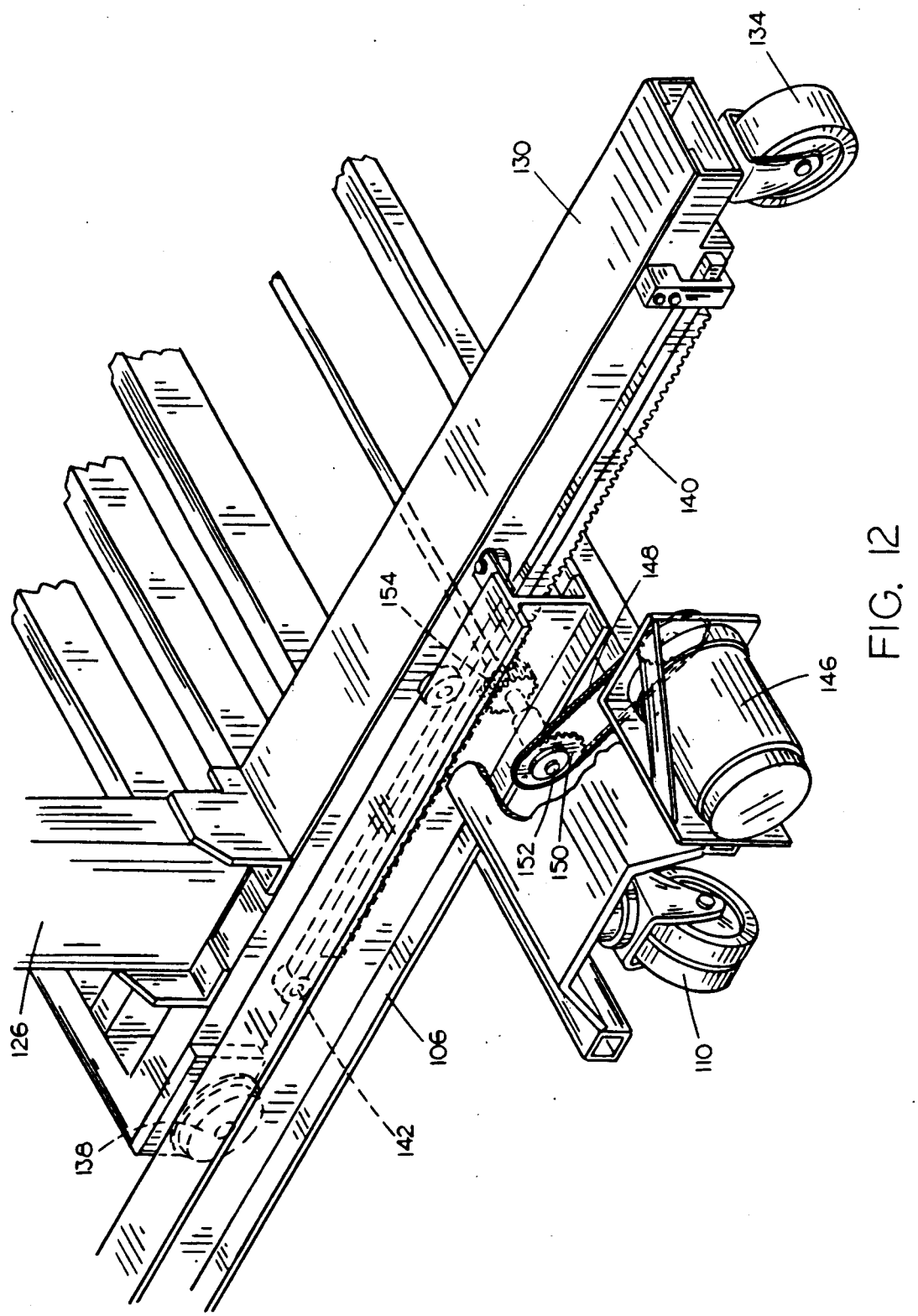
FIG. 12 is a perspective view illustrating the structure at the lower end of the cantilever portion of the forklift truck.

Mast 122 is mounted on the wheeled frame means 102 and generally comprises a pair of upright masts or mast members 124 and 126 having cantilevers or supports 128 and 130 secured to the lower ends thereof which extend laterally outwardly therefrom and which have wheels 132 and 134 mounted at the outer ends thereof respectively. Mast 122 is also provided with a plurality of brace members 136 which extend between the various components for strength and rigidity. As seen in the drawings, mast 122 is laterally movably mounted on the wheeled frame means 102. The supports 128, 130 are movably mounted with respect to the frame members 104 and 106 as seen in the drawings. As seen in FIG. 12, support 130 has a rotatable guide wheel 138 provided thereon which is positioned between the inner flanges of the frame member 106. One end of a toothed rack 140 is pivotally connected to support 130 at 142 and extends outwardly therefrom along the side of support 130 as seen in FIG. 12. Motor 146 is positioned adjacent the wheel 110 as seen in FIG. 12 and has a chain 148 operatively connected thereto which extend around a sprocket 150 which is mounted on one end of shaft 152. Gear 154 is mounted on shaft 152 for rotation therewith and engages the underside of toothed rack 140. The other end of shaft 152 is provided with a gear identical to gear 154 which is in engagement with a toothed rack 156 mounted on support 128. Thus, rotation of the shaft 152 in one direction will cause the mast 122 to move outwardly with respect to the frame members 104 and 106. Conversely, rotation of the shaft 152 in an opposite direction will cause the mast 122 to move inwardly relative to the frame members 104 and 106.

Figure 8:
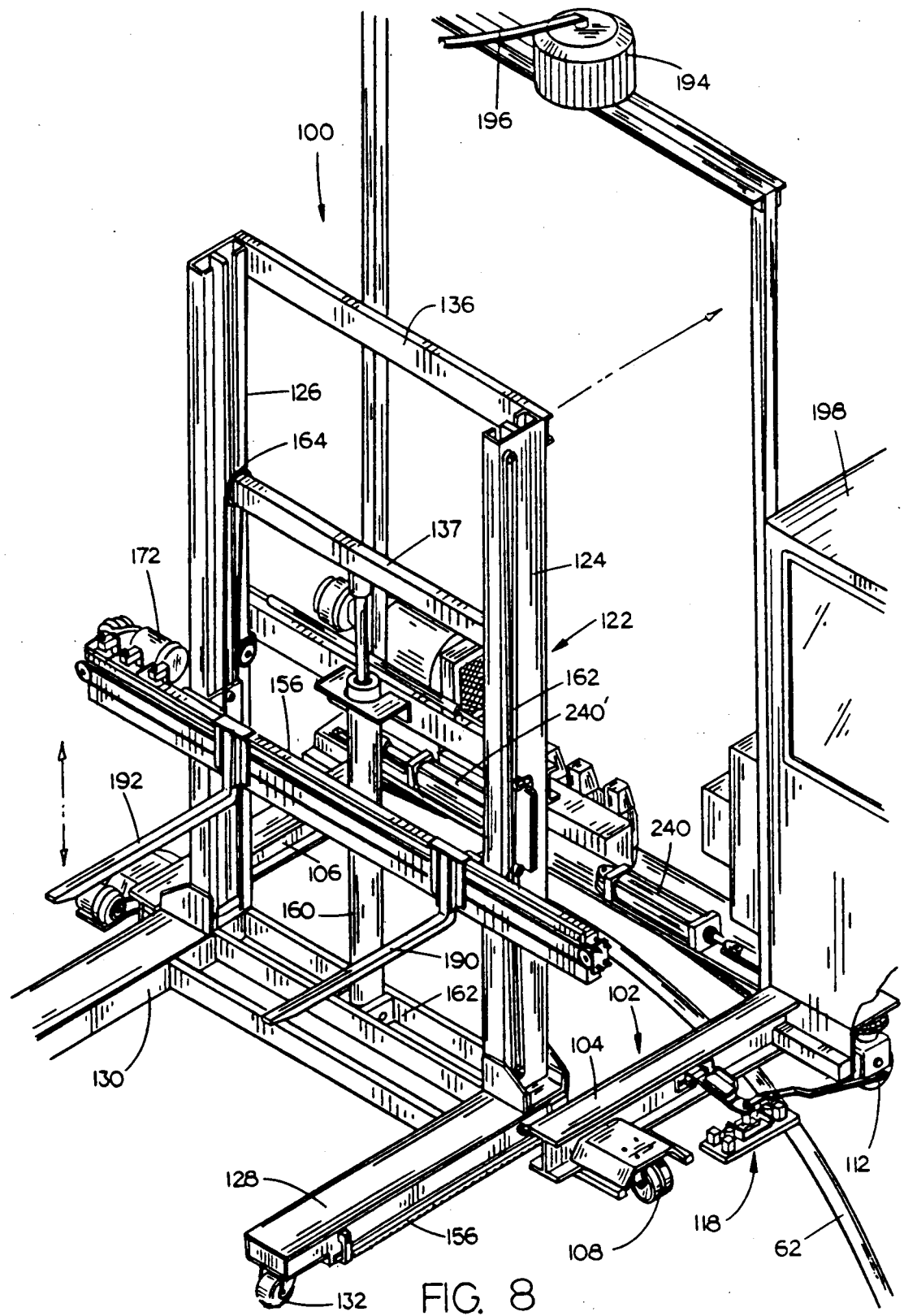
FIG. 8 is a partial perspective view of the electronically guided side-loading forklift truck utilized in the system of this invention.
Figure 9:
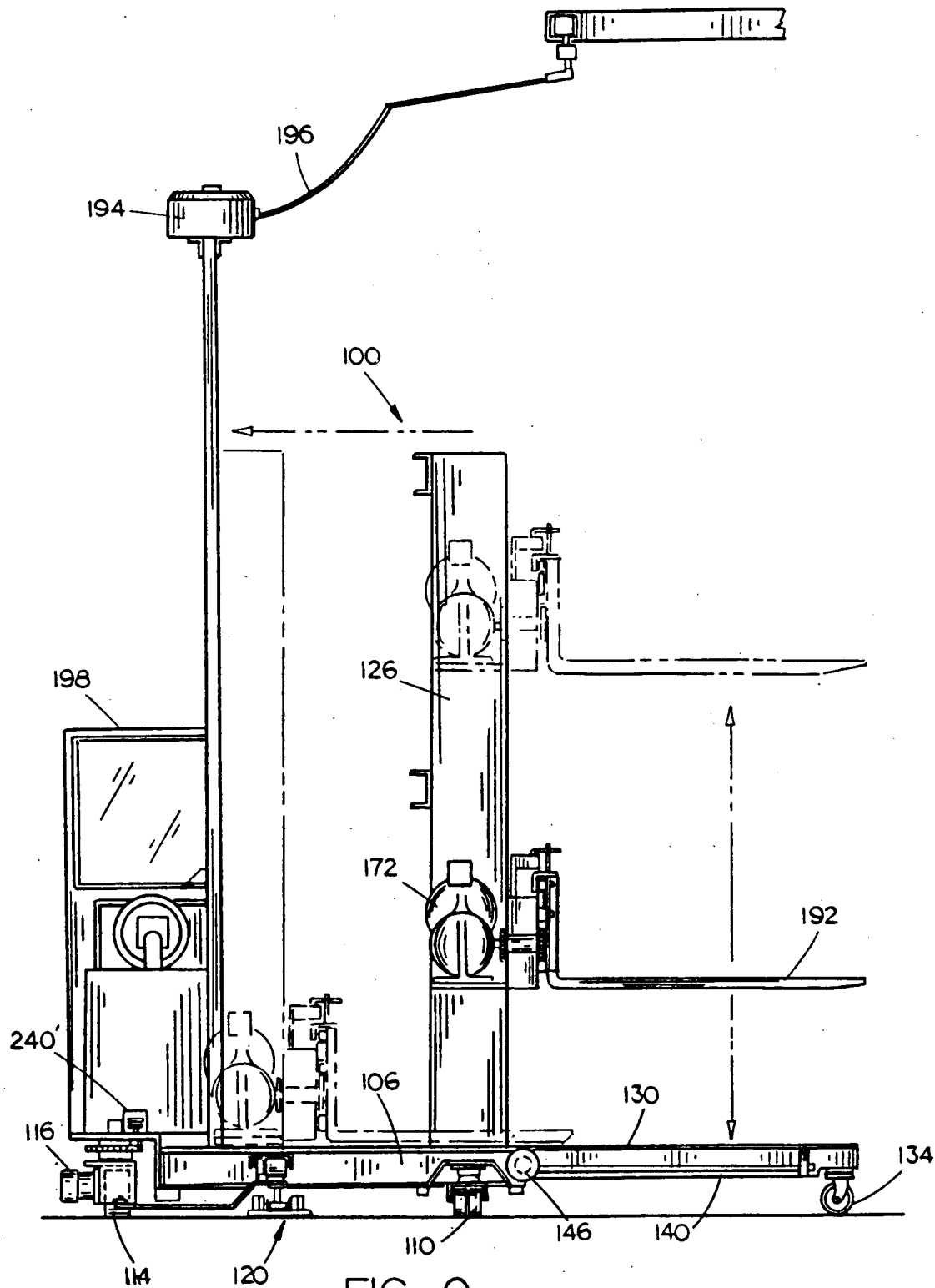
FIG. 9 is a side elevational view of the forklift truck of FIG. 8 with the broken lines indicating the various positions to which the forks may be moved.
Figure 10:
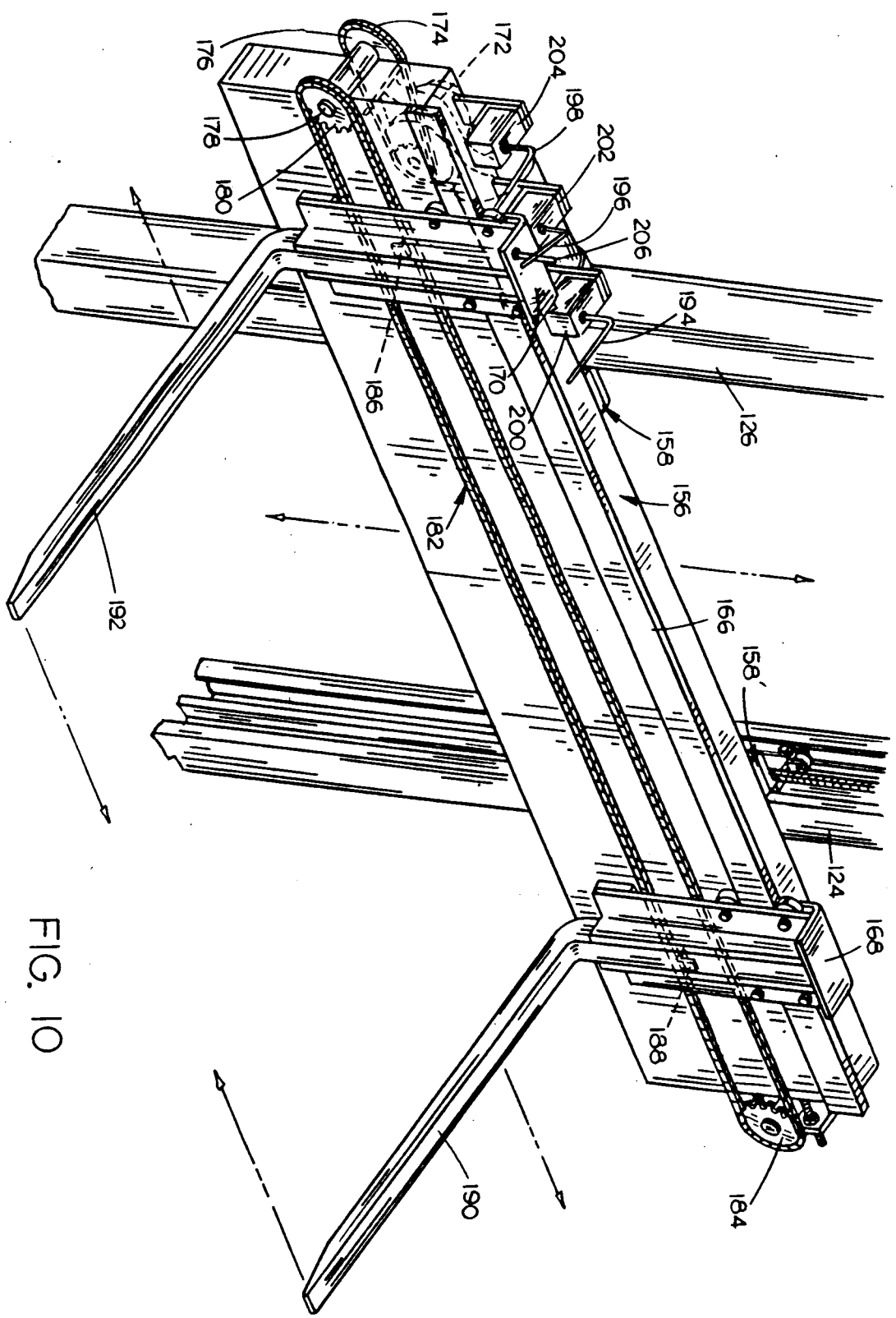
FIG. 10 is a perspective view illustrating the supporting structure for the forks of the forklift truck.
Figure 11:
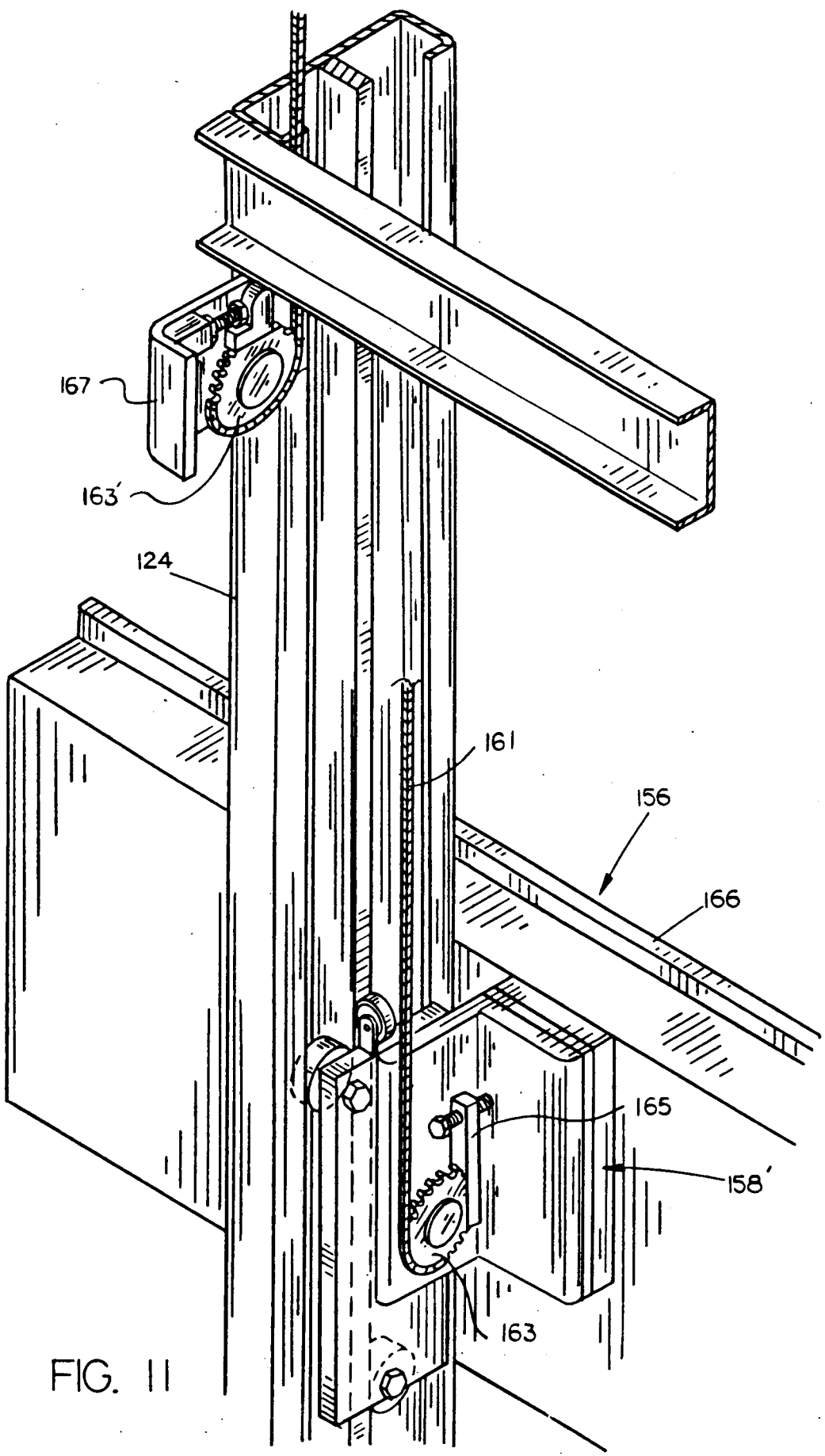
FIG. 11 is a partial rear perspective view of one of the masts and a portion of the fork support.

As seen in FIG. 10, a horizontally extending frame or carriage 156 is vertically movably mounted on the masts 124 and 126. Frame 156 is vertically movably mounted on the masts 124 and 126 by the roller bracket assemblies 158 and 158', respectively, as seen in FIG. 11. Each of the bracket assemblies 158 and 158' have one end of a chain 161 operatively secured to a sprocket 163 rotatably mounted thereon. Chain tightener assembly 165 is connected to the sprocket 163 as depicted in FIG. 11. The other end of chain 161 is connected to a sprocket 163' rotatably mounted on bracket 167 which is rigidly mounted on one of the masts. Each of the chains 161 are operatively mounted on a sprocket secured to the opposite ends of arm 137. Hydraulic cylinder 160 is connected at its lower end to the brace 162 which extends between supports 128 and 130 as seen in FIG. 8. The rod end of cylinder 160 is connected to arm 137 as also seen in FIG. 8. Extension of the cylinder 160 causes the arm 137 to vertically move upwardly which in turn moves frame 156 upwardly and so that retraction of the cylinder 160 causes the frame 156 to move downwardly relative to the masts 124 and 126.

Frame 156 is also provided with a horizontally extending bar 166 positioned at the upper outer end thereof. Fork supports 168 and 170 are horizontally movably mounted on the bar 166 as seen in FIG. 10. Motor 172 is mounted at the inner side of frame 156 and has a chain 174 operatively connected thereto which drives sprocket 176, shaft 178 and sprocket 180. Chain 182 is wrapped around sprocket 180 and extends across the length of the frame 156 where it is wrapped around sprocket 184 rotatably mounted at the other end of frame 156. The upper segment of the chain 182 is connected to fork support 170 at 186. The lower segment of chain 182 is connected to the fork support 168 at 188. Thus, operation of the motor 172 in a first direction will cause the fork supports 168-170 and the forks 190-192 mounted thereon to move outwardly relative to one another. Conversely, rotation of the motor 172 in an opposite direction will cause the forks 190 and 192 to move towards one another.

As seen in FIG. 10, arms 194, 196 and 198 of switches 200, 202 and 204 respectively are selectively engaged by a finger 206 extending upwardly from bracket 170 which senses the position of the forks so that they will be in the proper position for the three different sizes of pallets which are used in the facility.

Figure 18:
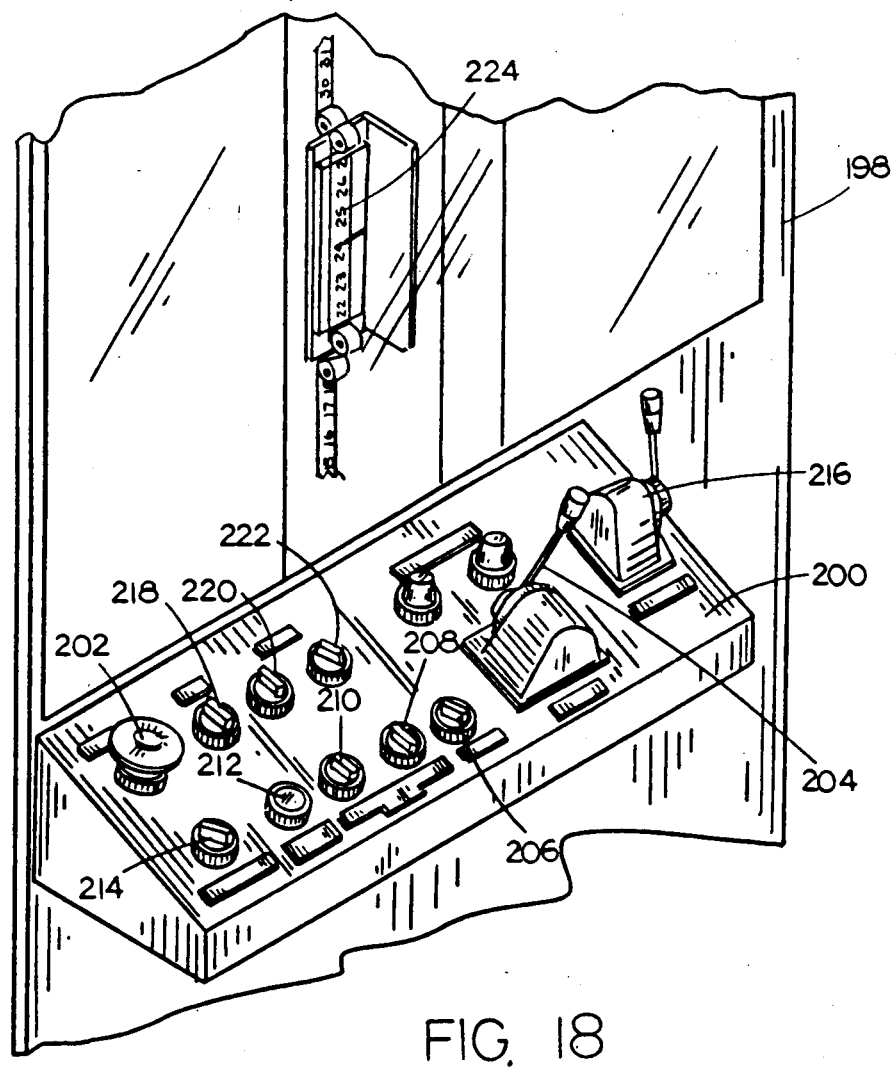
FIG. 18 is a perspective view illustrating the control panel for the forklift truck.

The various electrical components on the truck 100 gain their electrical power by means of a collector ring 94 having an electrical cable 196 extending therefrom. Cab 198 is mounted on the wheeled frame means 102 to provide an operator's station Located within the operator's cab 198 is a control console 200 as seen in FIG. 18. Console 200 includes such controls as start button 202, travel lever 204, fork out/in button 206, manual steer right 208, manual steer left 210, forks override 212, manual/automatic switch 214, fork up/down control 216, control button 218, rotate buttons 220 and 222, etc. Also located within the cab 198 is a fork height indicator means generally referred to by the reference numeral 224.

Figure 13:
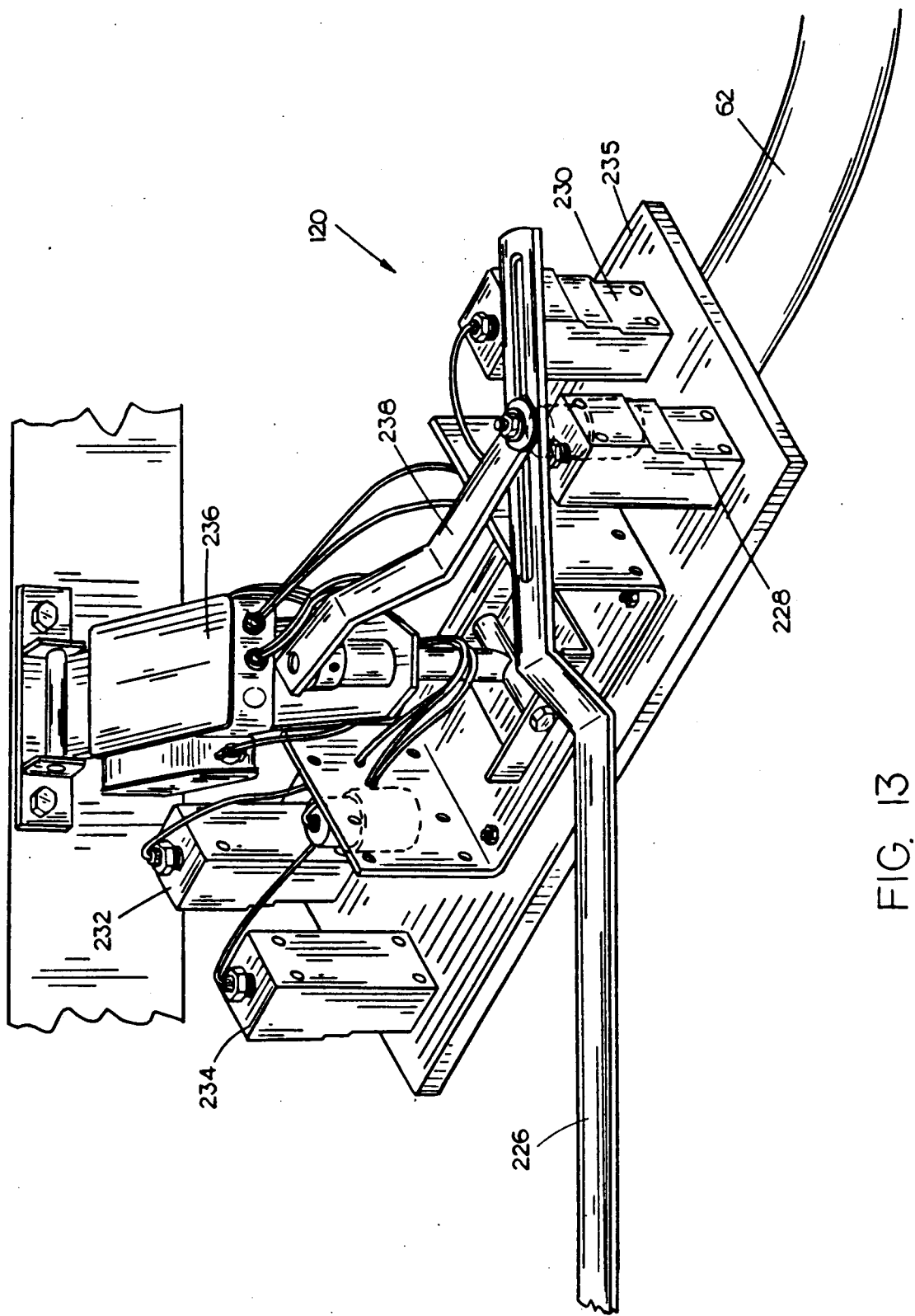
FIG. 13 is a perspective view of the sensor portion of the guidance system for the forklift truck.
Figure 14:
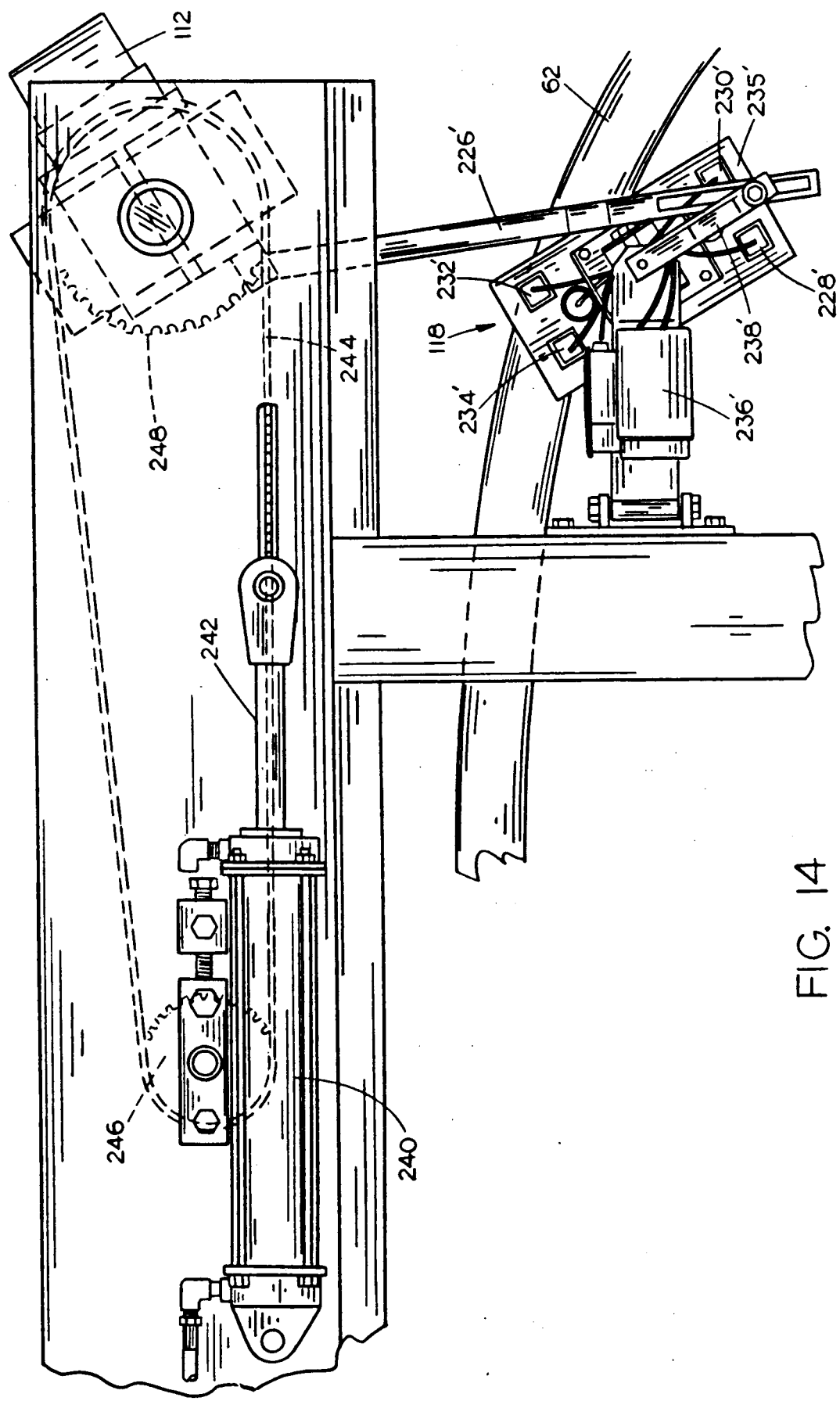
FIG. 14 is a top elevational view of a portion of the guidance system for the forklift truck.
Figure 15:
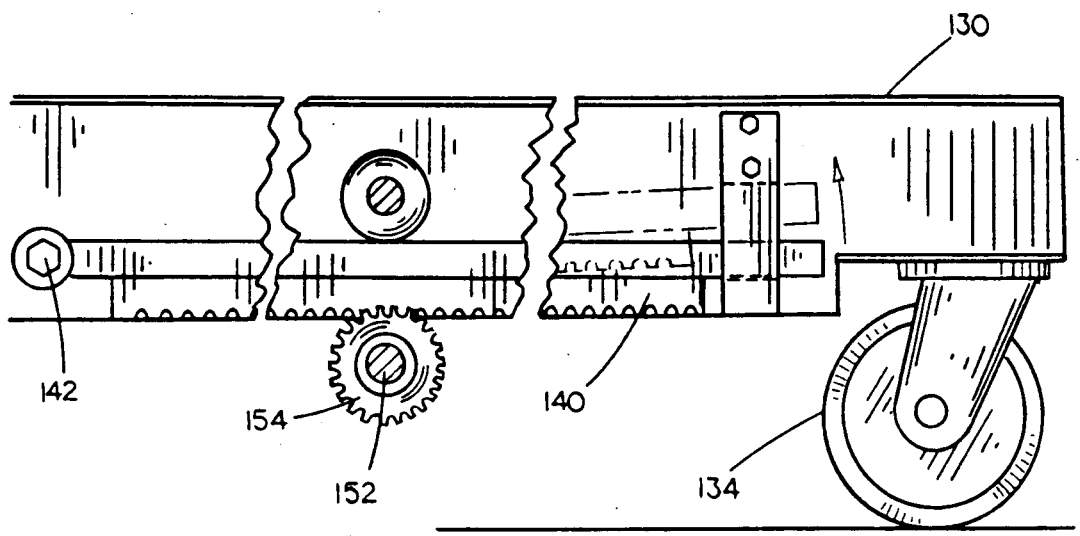
FIG. 15 is a partial side view of one of the mast cantilevers.
Figure 16:
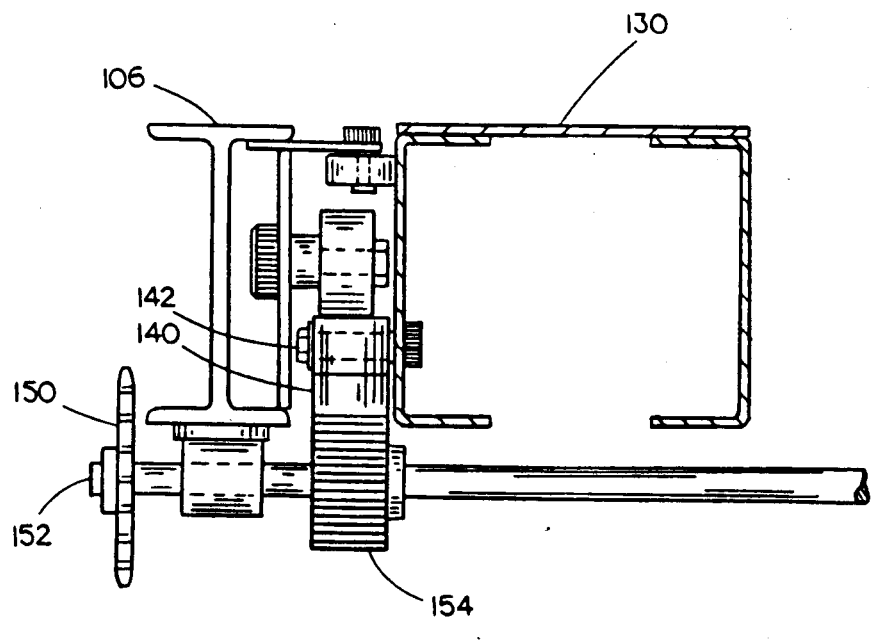
FIG. 16 is a sectional view of the cantilever of FIG. 15.
Figure 17:
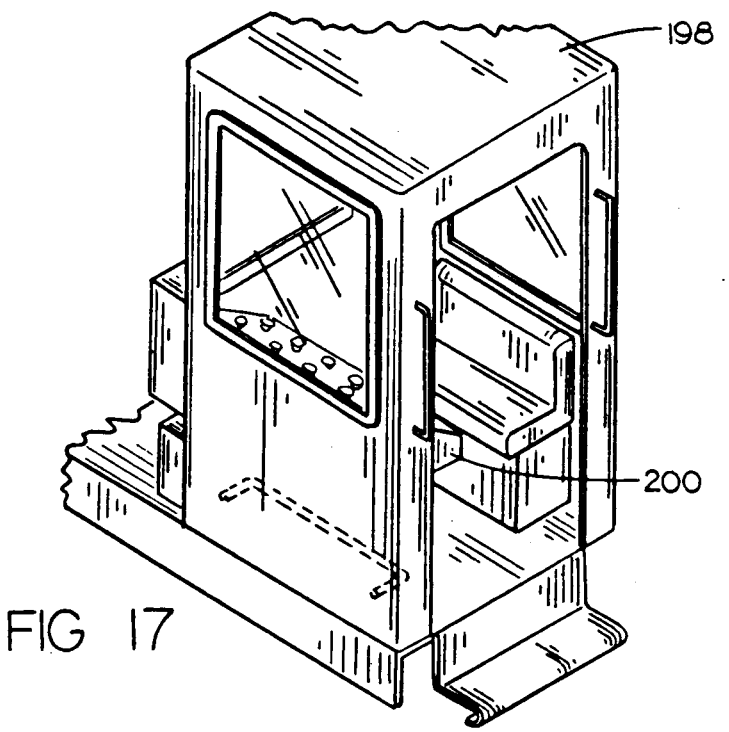
FIG. 17 is a perspective view of the operator's cab of the truck.

Referring to FIG. 13, the sensing mechanism 120 functions as follows to control the operation of hydraulic cylinder 240' to steer the wheel 114. Four conventional sensors 228, 230, 232 and 234 are mounted on plate 235 at the four corners thereof as seen in FIG. 13. The sensors sense the location of the relationship of the sensors with respect to the metallic strip 62. When the sensors sense that the vehicle is moving laterally from the metallic strip 62, control 236 actuates hydraulic cylinder 240' so that the vehicle will move into proper alignment with the strip 62 as the vehicle is traveling along metallic strip 62. FIG. 14 illustrates the hydraulic cylinder 240 and its operative connection to the wheel 112. Hydraulic cylinder 240' is identically connected to wheel 114. As seen in FIG. 14, the rod 242 of cylinder 240 is connected to a chain 244 which extends around sprockets 246 and 248. Sprocket 248 is operatively connected to the spindle of wheel 112 so that extension of the cylinder 242 will cause the wheel 112 to pivot in one direction and so that retraction of the rod 242 will cause the wheel 112 to pivot in an opposite direction. Cylinder 240' is operatively connected to the wheel 114 in a similar fashion as that just described. Thus, hydraulic cylinders 240 and 240' are actuated by the sensing mechanisms 118 and 120 respectively to properly maintain the vehicle over the metallic strip 62. There are some instances the vehicle so it is necessary to provide a means for turning the vehicle 180°. In such a case, the operation of the vehicle is shifted from the auto cycle to the manual cycle with the wheels 112 and 114 being manually steered by means of the hydraulic cylinders 240 and 242. Thus, when it is desired to rotate the vehicle 180° so that the forks extend to the opposite side, the sensing mechanisms 118 and 120 are deactivated and the hydraulic cylinders 240 and 240' are actuated to steer the vehicle while operating the drive wheels of the vehicle.

The system of this invention operates as follows. Truck 12 delivers the loaded skids or pallets 14 to the loading dock 16 An overhead crane or the like is utilized to lift and convey the loaded pallets 14 onto the dock 16. One of the loaded pallets or skids 14 is then lowered onto the conveyor section 18 which conveys the loaded skid onto the lowered end of conveyor section 28. The skids 14 are positioned on the conveyor section 28 in an end-to-end relationship. When the loaded pallet has been positioned over the conveyor section 28, conveyor section 28 is raised by inflating the air bags 30 so that the powered conveyor rollers 26 will engage the underside of the pallet and will convey the same to the left as viewed in FIG. 2. The conveyor section 28 is operated until the loaded skid is positioned over the end of the conveyor section 40. At that time, the lifting assembly 42 is lowered so that the lifting hooks 200 can grasp the metal sheets on the skid and raise the same upwardly from the skid. The empty skid or pallet is then discharged longitudinally to the left on the conveyor section 28 to the conveyor section 24 where it may be removed and stored for future use.

With the sheets suspended by the assembly 42, conveyor section 40 is utilized to convey a system pallet from the accumulator 50. Conveyor section will be in its uppermost position through the use of the inflatable bags 42 so that the system pallet will pass over the powered rollers on the conveyor section 28. Conveyor section 40 is then lowered so that the pallet will rest on the conveyor section 28. The lifting means 42 is then lowered to lower the metal plates onto the system pallet positioned therebelow. When the metal plates have been positioned on the system pallet and the lifting means 42 disconnected therefrom, the material and the system pallet is weighed by means of the weigh cells 36 provided in a printout by the printout means 37. Control 38 is also provided as seen in the drawings.

Conveyor section 40 is then raised to cause the system pallet and the metal plates thereon to be raised from the conveyor section 28. Conveyor section 40 is then actuated to convey the material transversely from the conveyor section 28.

The truck 100 is then used to lift the loaded pallet from the aisle side of the conveyor section 40. The truck 100 is maneuvered so that the forks 190 and 192 are received by the recessed portions 74 on the system pallet 48. The fact that the forks engage the pallet at the opposite ends thereof increases the stability of the lifting operation. Additionally, the fact that the forks are received in the recesses formed in the system pallet ensures that the forks can bypass loads positioned on pallets below the pallet being handled.

The truck 100 follows the metallic strip 62 until the desired cell in reached. The mast of the truck 100 is then maneuvered so that the loaded pallet is inserted into the desired cell. It is extremely important to note that the cantilever design of the mast prevents the truck from tipping since the wheels 132 and 134 are positioned substantially below the load being handled.

All of the loaded pallets 14 from the truck 12 are successively handled as described with the truck 100 being utilized to deliver the loaded system pallets to the desired storage bay and cell. The most frequently used material would normally be placed in the cells in the storage bays 58″ so that the conveyors 74, 76, 78 or 80 may be utilized to deliver the loaded pallets to the interior side of the storage bays where the material may be lifted from the pallets by an overhead crane or the like and taken to a press brake, etc. If unfinished metal plates are to be shipped to another location, the desired sheets may be carried by means of an overhead crane and the lifting means 52 to the conveyor section 44 where the material will be placed on a wooden skid. The weigh cells 46 may be utilized to ascertain the total weight of the material being placed on the loaded skid. When the material has been secured to the skid, the loaded wooden skid is conveyed to the right as viewed in FIG. 2 so that the same may be lifted from the conveyor and carried to a truck at the loading dock.

Thus it can be seen that the invention accomplishes at least all of its stated objectives.

We claim:

1. A materials handling system, comprising,
   a first elongated conveyor section having first and second ends adapted to receive, and transport, skids having metal sheets thereon, from said first end to said second end,
   a second elongated conveyor section having one end in operative communication with the second end of said first conveyor section,
   a first lifting means mounted above said second conveyor section for engaging and lifting the metal sheets from one of the skids, a third elongated conveyor section having a first end in operative communication with the second end of said second conveyor section adapted to receive and convey the skid away from said second conveyor after the sheets have been lifted therefrom, an elongated, transverse conveyor section extending transversely to said second conveyor section and in operative communication therewith for initially positioning a system pallet beneath the sheets which have been lifted from the skid by the said first lifting means and for transversely conveying the system pallet away from said second conveyor section after the sheets have been placed thereon, said first, second, third and transverse conveyor sections being substantially horizontally disposed, means for moving the loaded skids from said first conveyor section to said second conveyor section, means for moving the empty skids from said second conveyor section to said third conveyor section, and means for moving the system pallet beneath the sheets.

2. The system of claim 1 wherein said transverse conveyor section has one end extending into said second conveyor section normally below said second conveyor section, and means for raising and lowering said transverse conveyor section relative to said second conveyor section.

3. The system of claim 3 wherein said second conveyor section is selectively vertically movable relative to said first conveyor section.

4. The system of claim 1 including a weighing means, said second conveyor section being operatively supported on said weighing means.

5. The system of claim 1 including a weighing means, said third conveyor section being operatively supported on said weighing means.

6. The system of claim 1 wherein a second lifting means is movably mounted over said third conveyor section for engaging and lifting the metal sheets.

7. The system of claim 1 wherein a system pallet storage means is in communication with said transverse conveyor section for storing pallets therein which are to be loaded with the metal sheets.

8. The system of claim 1 wherein a second transverse conveyor section extends from said third conveyor section, said second transverse conveyor section being selectively vertically movable with respect to said third conveyor section, and means for vertically moving said second transverse conveyor section.

9. The system of claim 1 wherein one end of said transverse conveyor section is positioned laterally of said second conveyor section, an elongated frame means positioned laterally of said second and third conveyor sections defining an aisle therebetween, said elongated frame means defining a plurality of horizontally spaced bays, each of said bays defining a plurality of vertically spaced cells adapted to receive a system pallet therein, and means for conveying system pallets from said one end of said transverse conveyor section to one of said cells.

10. The system of claim 9 said means for conveying system pallets comprises a vehicle which is movable in said aisle and which is adapted to remove a system pallet from said one end of said transverse conveyor section and to transport the same to one of said cells.

11. The system of claim 10 wherein said vehicle is an electronically guided pallet truck means.

12. The system of claim 9 wherein said vehicle includes a pair of lifting forks extending therefrom adapted to engage, and support, a system pallet adjacent the opposite ends thereof.

13. A physically integrated materials handling system, comprising, a first elongated conveyor section having first and second ends adapted to receive, and transport, skids having metal sheets thereon, from said first end to said second end, a second elongated conveyor section having one end in operative communication with the second end of said first conveyor section, a first lifting means mounted above said second conveyor section for engaging and lifting the metal sheets from one of the skids, a third elongated conveyor section having a first end in operative communication with the second end of said second conveyor section adapted to receive and convey the skid away from said second conveyor after the sheets have been lifted therefrom, an elongated, transverse conveyor section extending transversely to said second conveyor section and in operative communication therewith for initially positioning a system pallet beneath the sheets which have been lifted from the skid by the said first lifting means and for transversely conveying the system pallet away from said second conveyor section after the sheets have been placed thereon, said first, second, third and transverse conveyor sections being substantially horizontally disposed, a plurality of pallet storage bays spaced laterally of said second and third conveyor sections defining an aisle therebetween, and an electronically guided forklift truck movably mounted in said aisle adapted to transport pallets from said transverse conveyor section to said storage bays and vice versa.

14. The system of claim 13 wherein a load pallet storage means is positioned remotely of said pallet storage bays, said loaded pallet storage means defining a plurality of vertically spaced and horizontally disposed cells for supporting pallets therein, and a plurality of horizontally disposed pallet conveyors extending into at least some of the cells for selectively removing a pallet from its cell.

* * * * *